Sept. 4, 1956 J. D. McLEAN, JR 2,761,558
HOLDER FOR MICROSCOPE SLIDES
Filed Aug. 23, 1954
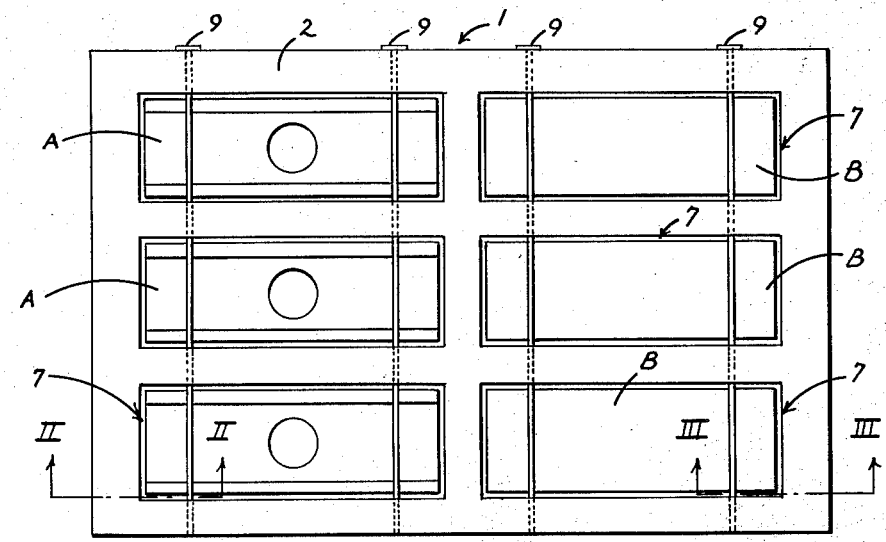
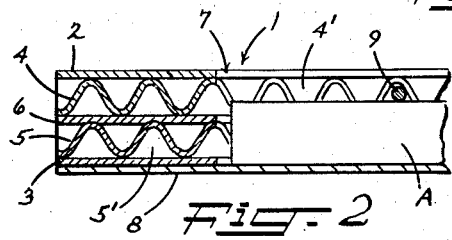
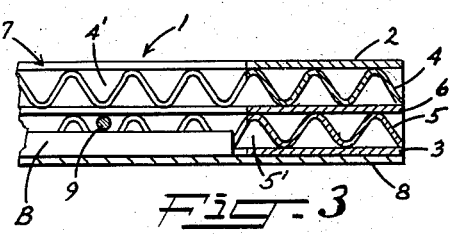
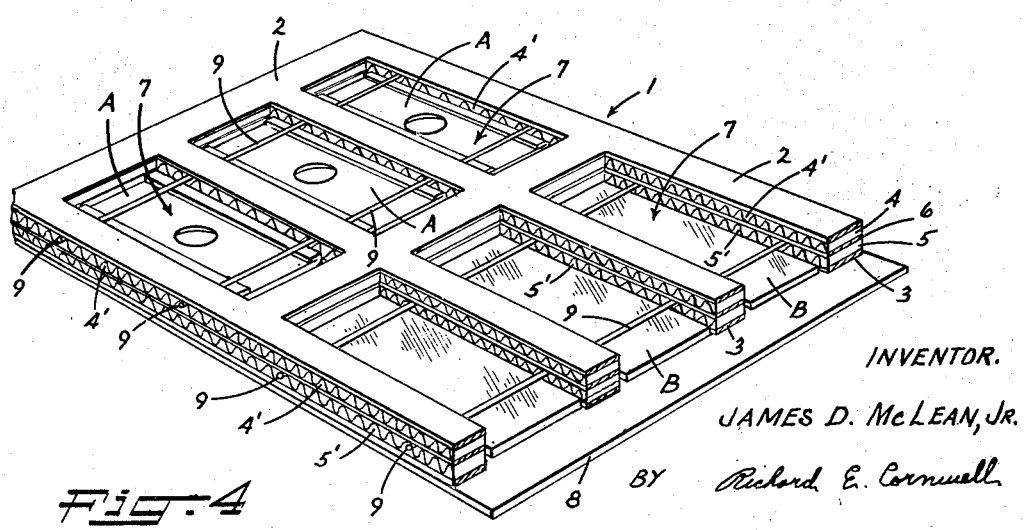
INVENTOR.
JAMES D. McLEAN, JR.
BY Richard E. Cornwell
ATTORNEY.

2,761,558

HOLDER FOR MICROSCOPE SLIDES

James Douglas McLean, Jr., Belle Haven, Fairfax County, Va.

Application August 23, 1954, Serial No. 451,509

4 Claims. (Cl. 206—62)

The present invention relates to a holder for specimen slides. In particular, the invention is concerned with a holder for microscope slides which have micro-matter mounted thereupon.

In certain fields of science, such as geology and biology, a worker accumulates a great many specimen microscope slides (also termed microslides) which must necessarily be retained for reference purposes. With present operations, the slides are usually stored in individual fashion in specially designed slide trays which trays are in turn stored within expensive, specially designed cabinets. The worker must continuously expend large sums of money for additional cabinets and trays to provide storing space for his ever increasing supply of specimen microslides.

The worker also frequently finds it necessary to mail the slides to associates, customers, and clients. The general practice, when mailing the slides, is to remove the slides from the trays and place them in mailing containers such as small woodboxes or stiff paper envelopes. When a plurality of the slides are to be mailed to the same destination, much time is consumed in packaging the slides for mailing as each slide must be handled individually.

An additional problem is presented, especially with the mailing of the microslides, when the worker must deal with slides of different thicknesses, for example, the ordinary thin glass microslide common to biological usage and the thicker micropaleontological cardboard slide with aluminum clip and glass cover, such as may be used for mounting small fossil bugs obtained from well drilling samples.

It is one object of the present invention to provide an inexpensive microslide holder of simple construction, which holder may be filed in standard size, general, office filing cabinets, thus eliminating the use of expensive, specially designed slide filing cabinets.

It is another object of the invention to provide a slide holder which, in addition to the above object, is also used as a mailing container for the slides already mounted therein.

It is a further object of the invention to provide an inexpensive slide holder which will accommodate microslides of different thicknesses for both filing and mailing purposes.

A better understanding of the invention may be had from the following description and drawings in which:

Figure 1 is a top view of the microslide holder,

Figure 2 is a view, partially in section, taken along lines II—II of Figure 1,

Figure 3 is a view, partially in section, taken along lines III—III of Figure 1 and, Figure 4 is a perspective view, partially cut away, of the microslide holder.

Briefly, the invention comprises a flat body piece having a plurality of cut out sections therein. A stiff backing sheet affixed to one surface of the body piece strengthens the body piece and also provides a support for the slides positioned within the cut out sections of the body piece. Small aligned channels or holes extend through the remaining uncut portions of the body piece from one edge thereof to the opposite edge in such a manner that their paths of alignment extend through the cut out sections in the body piece and lie above, but parallel to, the backing sheet. Slide retaining pins inserted through the channels, after the slides have been placed in the cut out sections, restrain the slides within the cut out sections from falling out and from being jostled around.

Referring now to the drawings, which illustrate the invention in a preferred form, the slide holder comprises a double corrugated layer cardboard body piece generally indicated at 1. The piece 1 comprises a top board surface 2 and a bottom board surface 3 between which are positioned upper and lower corrugation layers 4 and 5 respectively. An intermediate board 6 separates the corrugation layers 4 and 5. The layers 4 and 5 are so assembled that the corrugation channels 4', 4' and 5', 5' formed by each layer lie in parallel relationship with one another. Portions of the piece 1 are cut out to provide rectangular cut out sections generally indicated at 7, 7 and a sheet of stiff material 8, such as Bristol board, is affixed to one side of the piece 1 to form a backing therefor. When assembled, the corrugation channels 4', 4' and 5', 5' which have been cut intersect the longer sides of the rectangular cut out sections 7, 7.

The cut out sections 7, 7 house microslides A, A and B, B, the slides being supported by the backing sheet 8. As seen in Figures 2, 3, and 4, slides A, A are of greater thickness than slides B, B. Slides A, A represent the cardboard, aluminum clip, glass cover micropaleontological slides mentioned hereinabove while the slides B, B represent the thin glass microslide common to biological usage. To hold the slides in place within the cut out sections 7, 7, slide retaining pins 9, 9 are inserted through certain of the aligned corrugation channels 4', 4' and 5', 5' which intersect the cut out sections 7, 7. The pins 9, 9 extend from one edge of the body piece 1 to the opposite edge thereof. As seen in Figures 2 and 4, the retaining pins 9, 9 are inserted through certain of the aligned corrugation channels 4', 4' within the upper corrugation layer 4 to retain the thicker slides A, A in place within the cut out sections 7, 7 while, as seen in Figures 3 and 4, the retaining pins 9, 9 are inserted through certain of the aligned corrugation channels 5', 5' within the lower corrugation layer 5 to retain the thinner slides in place. The pins 9, 9 do not touch the slides but lie immediately above the slide faces thereby permitting only very slight vertical movements of the slides. The pins 9, 9 when in position, overlie the slides adjacent the end sections of the slides so that any slight movements of the slides against the pins will not damage the specimens which are usually mounted adjacent the central sections of the slides. To remove the slides from the holder, the pins 9, 9 are merely removed from the channels and the slides removed from the cut out sections 7, 7. The retaining pins are preferably formed from metal, however, wood or bamboo dowels may be used instead of the metal pins.

The body piece 1 may also be constructed from wood, moulded plastic or other suitable material, in which case the aligned channels or holes are drilled out of the uncut portions of the piece 1 or formed during the moulding operation. The holes lie parallel with a backing and one series of holes is near the backing while the second or upper series of holes is near the top surface of the piece 1. The channels are formed, of course, so that their paths of alignment intersect the longer sides of the rectangular cut out sections 7, 7 and lie above the backing 8.

The advantages of the slide holder described hereinabove are many and diversified. The holder is simple in construction and inexpensive, and can be constructed to house a single slide or a plurality of slides of the same or of different thicknesses. The holder, with the slides positioned therein, may be stored in standard, office filing cabinets such as 8 by 11 inch or 5 by 8 inch cabinets, depending upon the size of the holder. Specimen identification cards, which describe the specimens held by the slides in the holder, may be clipped to the holder and filed therewith. This eliminates the necessity of maintaining separate filing cabinets for the slides and identification cards. In addition, small identification tabs may be affixed to the top portion of the holder. If the slides are to be mailed, the holder containing the desired slides may merely be removed from the file cabinet, placed within a suitable outer mailing envelope, such as one constructed of cardboard, and mailed; thus eliminating the need of handling each slide individually when packaging them for mailing. If necessary, cardboard sheets may be placed against both the top and bottom surface of the holder before it is placed within the mailing envelope to provide additional support for the holder. The retaining pins 9, 9 keep the slides in position and prevent them from being jostled or damaged in transit. The holder may be reused numerous times for both mailing and filing purposes.

It is to be understood that the foregoing description is merely illustrative and that changes and variations may be made without departing from the spirit and scope of the invention as defined in the appended claims.

I claim:

1. A holder for microscope slides of varying thicknesses comprising a body section having rectangular cut out sections, a backing for the body section for strengthening the body section and for supporting slides placed within the body cut out sections, a first lower series of aligned channels defined by and extending through the uncut body portions, a second upper series of aligned channels defined by and extending through the uncut body portions, said first and second series of aligned channels lying in parallel relationship with the backing and top surface of the body section and intersecting the longer sides of the rectangular cut out sections, slide retainers positioned within the first lower series of channels for holding the thinner slides positioned within the cut out sections in place, and slide retainers positioned within the second upper series of channels for holding the thicker slides in the cut out sections in place.

2. A holder for microscope slides of varying thicknesses according to claim 1 wherein the body section comprises a double corrugated layer cardboard sheet, said corrugation layers being so assembled that the channels formed by each corrugation layer are parallel with one another.

3. A holder for microscope slides of varying thicknesses according to claim 1 wherein the first lower series of channels comprise the spaces defined by the lower corrugation layer of a double corrugated layer cardboard sheet, and the second upper series of channels comprise the spaces defined by the upper corrugation layer of the double corrugated layer cardboard sheet.

4. A holder for microscope slides of varying thicknesses comprising a body section having cut out sections, a backing for the body section for supporting slides placed within the body cut out sections, a first lower series of aligned channels defined by and extending through the uncut body portions, a second upper series of aligned channels defined by and extending through the uncut body portions, said first and second series of aligned channels lying in parallel relationship with the backing and top surface of the body section and intersecting the cut out sections, slide retainers positioned within the first lower series of channels for holding the thinner slides positioned within the cut out sections in place, and slide retainers positioned within the second upper series of channels for holding the thicker slides in the cut out sections in place.

References Cited in the file of this patent

UNITED STATES PATENTS

| | | |
|---|---|---|
| 1,362,282 | Beadle | Dec. 14, 1920 |
| 1,634,699 | Upjohn | July 5, 1927 |
| 1,960,558 | Stein | May 29, 1934 |
| 2,663,416 | Hirsch | Dec. 22, 1953 |

FOREIGN PATENTS

| | | |
|---|---|---|
| 27,107 | Great Britain | Nov. 25, 1913 |